Feb. 10, 1925.
C. D. STEWART
1,525,596
BRAKE VALVE DEVICE
Filed May 3, 1924
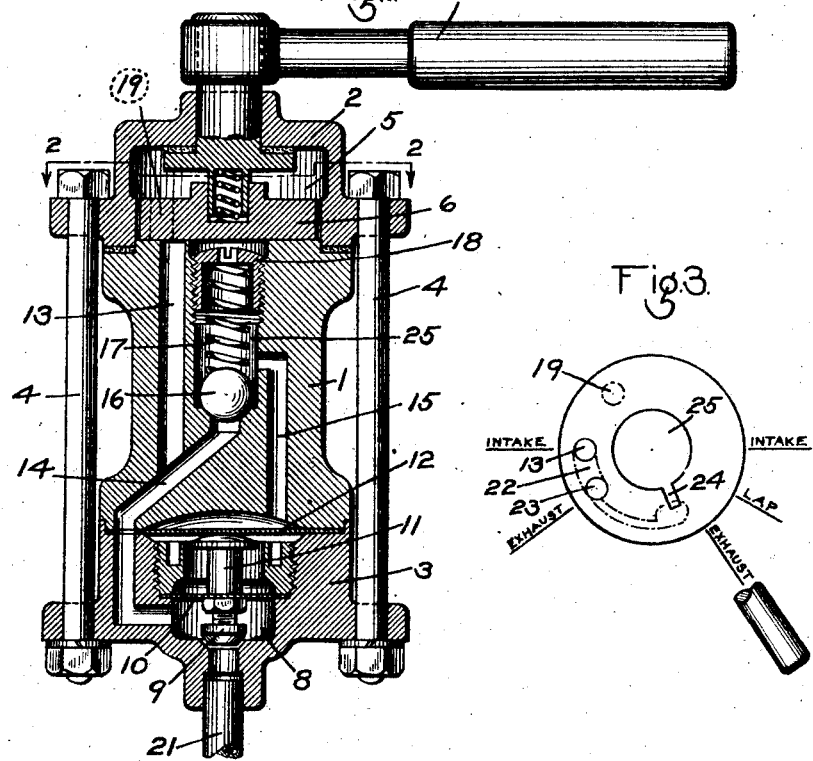
INVENTOR
CARLTON D. STEWART
BY *Wm. M. Cady*
ATTORNEY Patented Feb. 10, 1925.

1,525,596

UNITED STATES PATENT OFFICE.

CARLTON D. STEWART, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed May 3, 1924. Serial No. 710,745.

*To all whom it may concern:*

Be it known that I, CARLTON D. STEWART, a citizen of the United States, residing at Berkeley, in the county of Alameda and State of California, have invented new and useful Improvements in Brake-Valve Devices, of which the following is a specification.

This invention relates to brake valve devices, and more particularly to a brake valve device adapted for a fluid pressure operated automotive brake.

The principal object of my invention is to provide an improved brake valve device of the above character.

In the accompanying drawing; Fig. 1 is a vertical section of a brake valve device embodying my invention; Fig. 2 a section on the line 2—2 of Fig. 1; and Fig. 3 a diagram, showing the rotary valve in release position.

As shown in the drawing, the construction may comprise a casing 1, a rotary valve chamber casing section 2, and a regulating valve casing section 3. The sections 2 and 3 are applied to the respective upper and lower ends of casing 1 and are secured in position by means of bolts 4.

The casing section 2 has a valve chamber 5 containing a rotary valve 6 adapted to be operated by a handle 7 and the casing section 3 has a valve chamber 8 containing a valve 9, said valve being carried by a flexible diaphragm 10. A stem 11 extends from diaphragm 10 to a second diaphragm 12 of greater area than the diaphragm 10.

A passage 13 in casing 1 leads from the valve seat of rotary valve 6 to an inclined passage 14, which connects with valve chamber 8. A passage 15 leads to the chamber above diaphragm 12 and a ball check valve 16 controls communication from passage 14 to passage 15. Said check valve is subject to the pressure of an adjustable coil spring 17 and the pressure of said spring may be adjusted by means of an adjusting screw 18. The spring 17 is adjusted to the maximum pressure at which it is desired to limit the brake cylinder pressure.

In operation, to apply the brakes, the handle 7 is turned, so that a through port 19 in the rotary valve 6 registers with passage 13. Fluid under pressure is then supplied from rotary valve chamber 5, which is connected by pipe 20 to a source of fluid under pressure, to valve chamber 8, and acting on diaphragm 10, operates to hold the valve 9 fully open. Fluid is thus supplied to the brake chamber through pipe 21, to effect an application of the brakes.

When the desired braking force is obtained, the operator turns the handle 7 to cut off the further supply of fluid to the brake chamber, and when he desires to release the brakes, he moves the handle 7 to a position in which a cavity 22 in the rotary valve 6 connects passage 13 with an atmospheric exhaust port 23. In order to release the fluid pressure on the upper face of diaphragm 12, a cavity 24 is extended from spring chamber 25, and in release position said cavity registers with an extended portion of the cavity 22.

If the handle 7 should be left in application position, either by accident or design, the pressure supplied to the brake chamber will be automatically limited to the desired point, since the pressure of fluid in passage 14 acts on the check valve 16, and when the pressure in said passage increases to a predetermined degree, the check valve 16 will be unseated, permitting flow of fluid through passage 15 to diaphragm 12. The diaphragm 12 being of greater area than the diaphragm 10, the diaphragms will be moved downwardly, so as to seat the valve 9 and thus cut off the further flow of fluid to the brake chamber.

Having now described my invention, what I claim as new and desire to secure by Letters Patent, is:—

1. A brake valve device comprising a casing, a valve in said casing for controlling communication through which fluid is supplied to apply the brakes, a movable abutment for operating said valve, and valve means operated at a predetermined pressure of fluid supplied in applying the brakes for admitting fluid under pressure to said diaphragm to operate same for closing said valve.

2. A brake valve device comprising a casing, a valve in said casing for controlling communication through which fluid is supplied to apply the brakes, a manually operated valve for supplying fluid under pressure to the first valve, and means operated upon a predetermined increase in pressure of fluid supplied by said manually operated valve for closing the other valve.

3. A brake valve device comprising a casing, a valve in said casing for controlling communication through which fluid is supplied to apply the brakes, a movable abutment operated by fluid under pressure for closing said valve, and a spring pressed valve operated at a predetermined pressure of fluid supplied through the other valve for admitting fluid to said abutment.

4. A brake valve device comprising a casing, a valve in said casing for controlling communication through which fluid under pressure is supplied to apply the brakes, a movable abutment for operating said valve and having differential areas, subject on one side to the pressure of fluid supplied to apply the brakes, and means operated upon a predetermined increase in the pressure of fluid supplied for admitting fluid under pressure to the other side of said abutment to thereby operate the abutment to close said valve.

In testimony whereof I have hereunto set my hand.

CARLTON D. STEWART.